Dec. 14, 1926.  
T. J. GORMAN, SR., ET AL  
1,611,023  
SPRING ATTACHING TOOL  
Filed Oct. 2, 1925
Fig. 1.
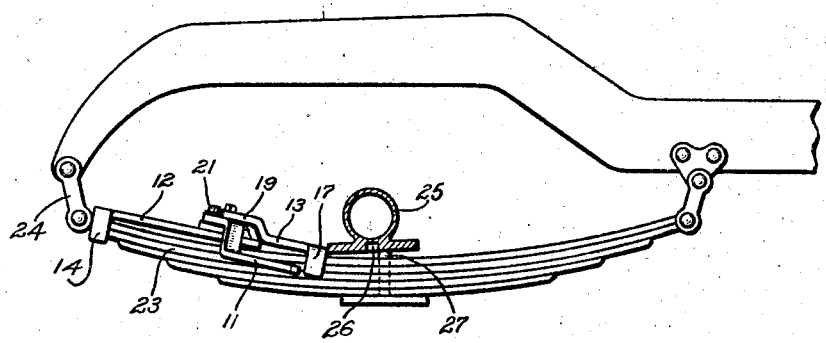
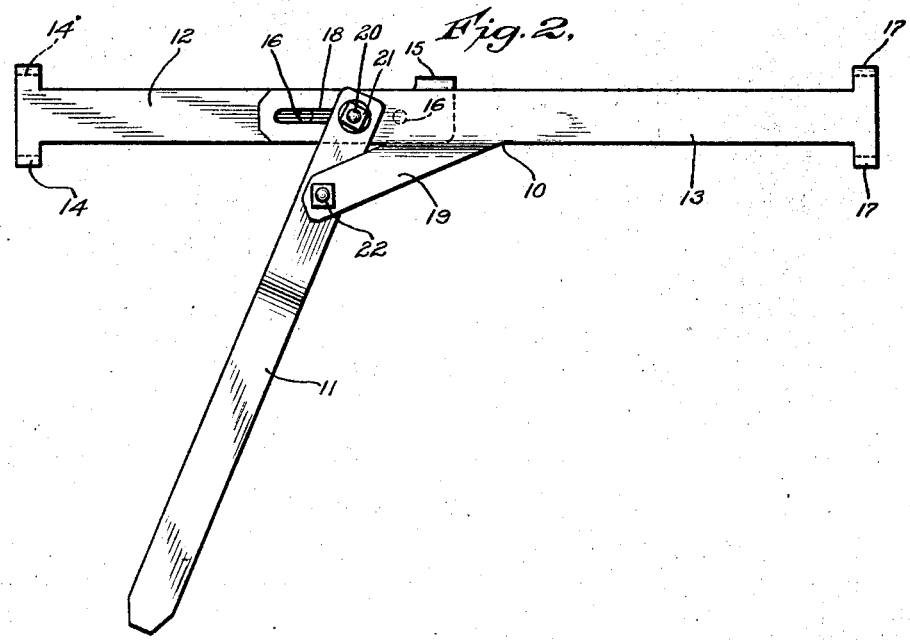
Fig. 3.
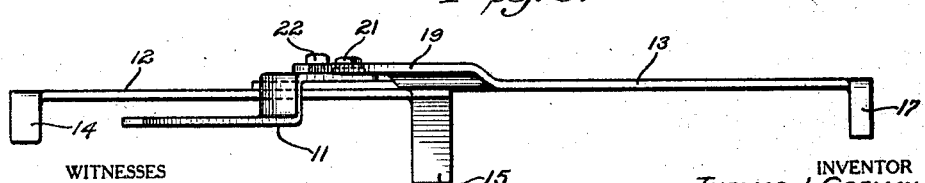
WITNESSES  
E. A. Wilson  
Chris Feinle
INVENTOR  
THOMAS J. GORMAN, SR.,  
THOMAS J. GORMAN, JR.,  
BY  
ATTORNEYS Patented Dec. 14, 1926.

1,611,023

UNITED STATES PATENT OFFICE.

THOMAS JOHN GORMAN, SR., AND THOMAS JOHN GORMAN, JR., OF NEWARK, NEW JERSEY.

SPRING-ATTACHING TOOL.

Application filed October 2, 1925. Serial No. 60,073.

This invention relates to a tool capable of being employed for connecting or effecting the attachment of one part of a structure to another requiring the movement of one of the parts by the application of a considerable force or pressure relatively to the other part to which it is to be connected or attached. It has been found that among other things the tool of the present invention serves as an adequate means for effecting the attachment of the rear springs of an automobile chassis to the rear axle housing. This is usually accomplished by effecting the movement of the housing relatively to the springs so that a stud carried by the springs respectively may enter a recess in the adjacent end of the housing. Considerable difficulty is experienced in effecting the movement of the housing due to the close proximity of the parts and the fact that they are inaccessible without the use of some suitable tool.

It is therefore the prime object of the present invention to provide a tool capable of being employed for effecting the movement of a part such as an axle housing relatively to a part such as a cushion spring to permit the proper association and attachment of the housing to the spring.

Another object of the invention is to provide a tool for the purpose mentioned hereinabove and other similar purposes which consists of an extensible element embodying means for maintaining the element against displacement when in repose, and leverage means for facilitating the extension of the element in which the proximate force will be multiplied in the attaching operation in the use of the tool.

The nature of the invention and its distinguishing features and advantages will appear when the following specification is read in conjunction with the accompanying drawing, in which:

Figure 1 is a view of a portion of a frame of an automobile chassis, one of its suspension springs and rear axle housing, showing the tool of the present invention in place on the spring and in condition to be operated to move the housing relatively to the spring for the attachment of the housing in its proper place.

Fig. 2 is a plan view of the tool itself in an extended condition.

Fig. 3 is a side elevation of the tool with the parts in a similar relationship as shown in Fig. 2.

Generally stated, the tool of the present invention comprises an extensible element 10 and a lever 11 for effecting the extension and retraction of the element 10. The element 10 in the present instance consists of a work engaging member 12 and a work engaging member 13. The member 12 embodies work engaging and retaining lugs 14 at one end, a work engaging and retaining lug 15 at the opposite end, and a plurality of bolt holes 16 near the end having the lug 15. The member 13 embodies work engaging and retaining lugs 17 at one end, has a slot 18 at the opposite end, and is provided with a lateral extension 19 near the slotted end. A bolt 20 is employed to extensibly associate the members 12 and 13, and this is accomplished by extending the bolt 20 through one of the holes 16 in the member 12, extending said bolt through the slot 18 in the member 13 and applying a nut 21. In order to effect the extension and retraction of the members 12 and 13 relatively to each other the lever 11 hereinbefore mentioned is applied in the manner presently to be described. One end of the lever has a hole therein for the reception of the bolt 20, and said lever is pivotally connected to the extremity of the extension 19 by virtue of the use of a bolt 22.

From the foregoing it will be apparent that when the members 12 and 13 are placed in repose on one end of a spring such as the spring 23 shown in Fig. 1 with the lugs 14, 15 and 17 in engagement with the opposite sides of the spring, and with one end of the member 12 in engagement with the shackle 24 and one end member 13 in engagement with the attaching plate of the axle housing 25, that movement of the member 13 will be effected upon the movement of the lever 11 to the right. As a consequence the housing 25 will also be moved to the right bringing the recess 26 and the attaching plate of the housing in alignment with the end of the stud 27 embodied by the spring 23. It will be appreciated that considerable pressure is required to move the housing and the tool of the present invention serves adequately for accomplishing this end.

We claim:

1. A tool comprising work engaging members connected together for relative movement in opposite directions, lever means for effecting the relative movement of said members in opposite directions, and means which engages work and which also maintains said members substantially in alignment when the tool is in use.

2. A tool of the class described comprising work engaging members each having retaining lugs for maintaining the members in substantial alignment when reposing, means extensibly associating said members, and means for effecting the extension and retraction of said members when in repose with their lugs engaged with the work.

3. A tool of the class described comprising work engaging members each having retaining lugs for maintaining the members in substantial alignment when reposing, means extensibly associating said members, and lever means for effecting the extension and retraction of said members when in repose with their lugs engaged with the work.

4. A tool of the class described comprising work engaging members each of which has work engaging and retaining lugs, a bolt carried by one of said members which enters a slot in the other member for extensibly associating said members, and a lever connected to said bolt and being pivotally connected to one of said members for effecting the extension and retraction of said members.

5. A tool comprising two work engaging members, each of said members having spaced work engaging and retaining lugs at one end thereof, a bolt carried by one of said members which is disposed in a slot in the other member extensibly associating said members, and an arm connected to said bolt and pivotally connected to a fixed extension on the member having the slot for effecting the extension and retraction of said members.

THOMAS JOHN GORMAN, Sr.
THOMAS JOHN GORMAN, Jr.